(12) United States Patent
Umkehrer et al.

(10) Patent No.: US 11,543,274 B2
(45) Date of Patent: Jan. 3, 2023

(54) THERMAL FLOWMETER INCLUDING A COUPLING ELEMENT WITH AN ANISOTROPIC THERMAL CONDUCTIVITY

(71) Applicant: Endress+Hauser Wetzer GmbH+Co. KG, Nesselwang (DE)

(72) Inventors: Alfred Umkehrer, Hopferau (DE); Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 0 days.

(21) Appl. No.: 16/646,244

(22) PCT Filed: Aug. 16, 2018

(86) PCT No.: PCT/EP2018/072230
§ 371 (c)(1),
(2) Date: Mar. 11, 2020

(87) PCT Pub. No.: WO2019/048210
PCT Pub. Date: Mar. 14, 2019

(65) Prior Publication Data
US 2020/0271495 A1    Aug. 27, 2020

(30) Foreign Application Priority Data
Sep. 11, 2017 (DE) .................... 10 2017 120 941.7

(51) Int. Cl.
*G01F 1/684* (2006.01)

(52) U.S. Cl.
CPC .............................. *G01F 1/6847* (2013.01)

(58) Field of Classification Search
None
See application file for complete search history.

(56) References Cited

U.S. PATENT DOCUMENTS 5,557,967 A * 9/1996 Renger ................. A61B 5/028
73/204.11
5,831,159 A    11/1998 Renger
(Continued)

FOREIGN PATENT DOCUMENTS

| CN | 1262735 A | 8/2000 |
|----|-----------|--------|
| CN | 1390297 A | 1/2003 |

(Continued)

*Primary Examiner* — Justin N Olamit
(74) *Attorney, Agent, or Firm* — Christopher R. Powers; Endress+Hauser (USA) Holding Inc.

(57) ABSTRACT

Disclosed is an apparatus for determining a flow of a medium through a pipe, as well as a method for operating the apparatus. The apparatus comprises a heating element at least partially in thermal contact with the medium and which is heatable by means of a heating signal, and a first temperature sensor for registering a temperature of at least one component of the apparatus or the temperature of the medium. The heating element and the first temperature sensor are arranged outside of the pipe. The apparatus includes at least one coupling element, which is at least partially in thermal contact with the heating element, the first temperature sensor and/or a portion of the pipe or tube and serves to assure a thermal coupling between the heating element and the first temperature sensor and between the heating element and the medium.

13 Claims, 4 Drawing Sheets

(56) References Cited

U.S. PATENT DOCUMENTS

| | | | |
|---|---|---|---|
| 6,883,369 B1 | 4/2005 | Myhre | |
| 7,444,863 B2 * | 11/2008 | Sakai | G01F 1/6847 |
| | | | 73/204.27 |
| 7,600,422 B2 * | 10/2009 | Hasebe | G01F 1/684 |
| | | | 73/204.17 |
| 9,562,811 B2 * | 2/2017 | Husheer | G01K 1/16 |
| 10,199,136 B2 * | 2/2019 | Mabuchi | H02K 1/04 |
| 10,458,825 B2 * | 10/2019 | Ozaki | G01F 1/688 |
| 2008/0184790 A1 | 8/2008 | Ding et al. | |
| 2010/0242592 A1 | 9/2010 | Haneef et al. | |
| 2011/0030468 A1 | 2/2011 | Chen et al. | |
| 2013/0098150 A1 | 4/2013 | Sella | |
| 2016/0252382 A1 | 9/2016 | Nishino et al. | |

FOREIGN PATENT DOCUMENTS

| | | |
|---|---|---|
| CN | 1954196 A | 4/2007 |
| CN | 102575952 A | 7/2012 |
| CN | 104374440 A | 2/2015 |
| DE | 3419504 A1 | 1/1986 |
| DE | 102014119223 B3 | 3/2016 |
| DE | 102014114848 A1 | 4/2016 |
| EP | 0131318 A1 | 1/1985 |
| EP | 1223411 A1 | 7/2002 |
| WO | 02090897 A1 | 11/2002 |
| WO | 2010023255 A1 | 3/2010 |

* cited by examiner

Fig. 5c

THERMAL FLOWMETER INCLUDING A COUPLING ELEMENT WITH AN ANISOTROPIC THERMAL CONDUCTIVITY

CROSS-REFERENCE TO RELATED APPLICATIONS

The present application is related to and claims the priority benefit of German Patent Application No. 10 2017 120 941.7, filed on Sep. 11, 2017 and International Patent Application No. PCT/EP2018/072230, filed on Aug. 16, 2018, the entire contents of which are incorporated herein by reference.

TECHNICAL FIELD

The invention relates to an apparatus for determining and/or monitoring volume flow, mass flow and/or flow velocity of a flowable medium in a pipeline and to a method for operating an apparatus of the invention. The apparatus includes a heating element and a first temperature sensor. The heating element is at least partially and/or at times in thermal contact with the medium and is at least at times heatable by means of a heating signal. The first temperature sensor serves, in turn, for registering a temperature of at least one component of the apparatus or a temperature of the medium and is operable by means of a first temperature signal.

BACKGROUND

Thermal, or calorimetric, flowmeters find multiple application in process- and/or automation technology. Corresponding field devices are produced in a wide variety of embodiments by the applicant and are sold, for example, under the marks, t-switch, t-trend, t-mass, or Flowphant. The underpinning measuring principles are known from the state of the art. The terminology, flow, includes in the context of the present invention both volume flow as well as also mass flow of the medium. Likewise, a flow velocity of the medium can be ascertained. Fundamentally, flow can be determined in two different ways.

According to a first measuring principle, a sensor element is exposed to a medium flowing through a pipeline and heated in such a manner that its temperature remains essentially constant. In the case of known and at least at times constant properties of the medium, properties such as the temperature of the medium, its density or even its composition, the mass flow of the medium flowing through the pipeline can be ascertained from the heating power needed for holding the temperature at the constant value. The terminology, temperature of the medium, refers, in such case, to that temperature, which the medium has without an additional heat input of a heating element.

In the case of an alternative measuring principle, the heating element is, in contrast, operated with constant heating power and the temperature of the medium downstream of the heating element measured. In such case, the measured temperature of the medium provides information concerning mass flow.

In the case of both described measuring principles, especially in the case of variable temperature of the medium, moreover, a second sensor element, for example, a temperature sensor, can be used for temperature measurement of the medium.

The heating elements of thermal flowmeters are frequently in the form of resistance heaters. For example, so-called resistance elements, e.g. RTD resistance elements (Resistance Temperature Detector), especially platinum elements, are applied, such as commercially obtainable under the designations PT10, PT100, and PT1000. The resistance elements are heated via the conversion of electrical power supplied to them, e.g. as a result of an increased electrical current supply.

The determining and/or monitoring of volume flow mass flow, and/or flow velocity, is based fundamentally on the fact that the thermal contact resistance between the sensor element and the flowing medium changes as a function of flow velocity. If there is, for example, no flow present in the pipeline, the registering of the heat from the heating element occurs via heat conduction, heat radiation and, in given cases, also via free convection within the medium. For maintaining a certain temperature difference according to the first of the two described measuring principles, then, for example, an amount of heat constant with time is required. In the case of the presence of a flow, in contrast, there results an additional cooling of the sensor element by the flowing, especially colder, medium. An additional heat transport occurs due to forced convection. Correspondingly, as a result of a flow, an increased heating power must be supplied, in order to be able to maintain a fixed temperature difference relative to the temperature of the medium. Similar considerations hold for the second of the two described measuring principles.

The relationship between the heating power, or measured temperature, and the flow and/or flow velocity of the medium through the pipeline can also be expressed by means of the so-called heat transfer coefficient. In addition, different thermophysical properties of the medium as well as the pressure reigning in the pipeline have an influence on the measured flow. In order, for example, also to take the dependence of flow on these variables into consideration, different thermophysical properties in the form of characteristic lines or components of functional equations are stored within an electronics unit of the flowmeter.

For a high accuracy of measurement, basically, the thermal contact between the heating element and the flowing medium is decisive. Thus, for example, a change of thermal resistance of the heating element, which leads to a change of the heat transfer from the heating element to the medium in the case of otherwise constant flow conditions, can bring about considerable measured value error. A change of thermal resistance caused in such a manner is also referred to as sensor drift.

Regarding thermal resistance in a flowmeter, a distinction is made between inner thermal resistance and outer thermal resistance. The inner thermal resistance depends, among other things, on individual components within the sensor element, e.g. within a sleeve thereof. Thus, a sensor drift can occur as a result of defects occurring in soldered connections due to tensile loads from material expansion or the like. The outer thermal resistance is influenced, in contrast, by accretion formation, material removal or material transformation (e.g. corrosion) on the surfaces of the sensor element contacting the medium. A change of the outer thermal resistance is, thus, relevant especially over long periods of operation and/or in the case of contact with aggressive media. In the case of gaseous- or vaporous media, the measurement of mass flow or flow velocity can, moreover, be degraded also by condensation on at least one of the temperature sensors.

For registering volume flow, mass flow and/or flow velocity, the heating element is brought at least at times and/or partially into thermal contact with the medium. In this regard, the heating element is usually at least partially introduced into the pipeline or integrated into a sensor head, which is installable into an existing pipeline. By integrating the sensor element into a pipe or tube, a fast response time and high accuracy of measurement of the measuring device can be assured, since a change of the thermal contact resistance between the heating element and the flowing medium is then essentially directly detectable.

However, for certain applications, it can also be disadvantageous that the sensor unit protrudes inwardly into the process. Relevant here, on the one hand, is the installation or replacement of the measuring device, which requires then directly interacting with the process. Moreover, a sensor unit protruding into the process also influences the flow of the medium in the pipe.

Non-process contacting measuring devices for determining flow are known, for example, in the form of clamp-on, ultrasonic, flowmeters. In the case of such devices, the sensor unit is securable externally on the pipe or tube and does not protrude into the process. Such measuring devices are manufactured by the applicant and sold, for example, under the designation, Proline Prosonic.

When applying the thermal, or calorimetric, measuring principle, a construction of such type without a direct contact with the process is significantly more difficult to implement. For example, the particular pipe or tube conveying the medium as well as the external environment of the pipe or tube, especially the ambient temperature, have a large influence on the thermal behavior of the measuring device, and on the heat flow between the heating element, medium and, in given cases, the temperature sensor. Thus, an external positioning of the sensor unit of a thermal, or calorimetric flowmeter leads to a lessened response time to flow changes and, in given cases, also to a lower accuracy of measurement compared with a process contacting device.

SUMMARY

Starting from these considerations, an object of the present invention is to provide a thermal flowmeter having a high accuracy of measurement, wherein the thermal flowmeter can be installed and replaced in especially easy manner.

This object is achieved by the apparatus as claimed in claim 1 and by the method as claimed in claim 14.

Regarding the apparatus, the object of the invention is achieved by an apparatus for determining and/or monitoring a volume flow, a mass flow and/or a flow velocity of a flowable medium through a pipe or tube. The apparatus includes a heating element, which is at least partially and/or at times in thermal contact with the medium and which is at least at times heatable by means of a heating signal, and a first temperature sensor, which serves for registering a temperature, especially of at least one component of the apparatus or a temperature of the medium, and which is operable at least at times by means of a first temperature signal. The heating element and the first temperature sensor are arranged, furthermore, outside of an internal volume of the pipe or tube flowed through by the medium.

According to the invention, the apparatus includes, furthermore, at least one coupling element, which is at least partially in thermal contact with the heating element, the first temperature sensor and/or a portion of the pipe or tube and serves to assure a thermal coupling between the heating element and the first temperature sensor and between the heating element and the medium. The coupling element is composed at least partially of a material with an anisotropic thermal conductivity.

In the case of the apparatus of the invention, of concern is, thus, a measuring device, in the case of which the sensor unit does not protrude inwardly into the process. In this way, an influencing of the flow profile of the medium flowing through the tube can be avoided.

For supplying the heating element and first temperature sensor with the heating signal and the first temperature signal, the apparatus includes, for example, at least one electronics unit. The operating of the heating element and the first temperature sensor can, in such case, be coupled, or such can occur independently of one another. Furthermore, both pulsed as well as also time continuous heating signals and first temperature signals are possible.

All options known to those skilled in the art can serve as heating element and temperature sensor. For example, the heating element can be a resistance element, such as already mentioned above. The temperature sensor can likewise be embodied in the form of a resistance element. Alternatively, for example, also the temperature sensor can be a thermocouple.

For determining and/or monitoring mass flow and/or flow velocity of the medium, the heating element is brought in contact with the medium, especially thermal contact. Heat exchange takes place between the apparatus and the medium. In such case, the thermal contact resistance between the sensor element and the flowing medium changes as a function of the reigning flow velocity. There occurs, thus, a heat movement, or heat flux, from the heating element to the medium.

Since the heating element is, however, arranged outside an internal volume of the pipe or tube flowed through by the medium, there occurs not only a heat flow from the heating element to the medium, but, also, likewise a heat flow from the heating element to the components surrounding the heating element, for example, components of the measuring device, or the measurement point, especially those components in mechanical, or thermal, contact with the heating element, as well as a heat flow to the pipe or tube, or even to the environment. This can, in turn, lead to considerable corruptions of the measured value. In practice, the thermal contact resistance is, thus, not only dependent on the flow of the medium, but, also, in principle, also on the measurement point, the embodiment of the measuring device and the respective mechanical, or thermal contacts of the respective components. Of course, a number of other influences can likewise lead to a corruption of the ascertained thermal contact resistance and likewise play a central role.

The coupling element of the invention is provided for avoiding these types of problems in connection with a thermal flowmeter not protruding into the process. Since the coupling element assures a thermal coupling between the heating element and the first temperature sensor and a thermal coupling between the heating element and the medium, a heat movement, or a heat flux, from the heating element to other components of the measuring device, or the measurement point, down the tube, especially away from the measuring device, or even to the environment, is minimized. An undesired corruption of the ascertained thermal contact resistance is correspondingly likewise significantly reduced, or minimized.

For the embodiment of the coupling element, numerous options exist, which all fall within the scope of the present invention. The exact embodiment depends, in such case, among other things, on diverse aspects of the measuring device thus, also on the particular geometric situation. For example, the heating element and the first temperature sensor can both be arranged on top of one another as well as also next to one another, this leading to different arrangements of the coupling element. In each case, the coupling element cares for a thermal coupling between the heating element and the first temperature sensor and between the heating element and the medium. Between the heating element and the medium, there can be, besides the coupling element, also the wall of the pipe or tube. In such case, the coupling element is applied on the pipe or tube. The coupling element can, however, also be integrated into a subsection of the pipe or tube. In this regard, the coupling element can be embodied as a subsection of the pipe or tube.

The coupling element can, finally, in an additional embodiment, also provide a direct thermal coupling between the first temperature sensor and the medium.

The coupling element is especially made of a material having a high thermal conductivity. For example, the material can be a metal material.

Regarding anisotropic thermal conductivity, reference is made to German patent application 102017100267.7 (unpublished as of the earliest filing date of this application), in which the use of a corresponding material is described in connection with thermometers, as well as to German patent application No. 102017116408.1 (likewise unpublished as of the earliest filing date of this application), in which the application of a corresponding material is described in connection with thermal flowmeters. Comprehensive reference is taken to both applications in the context of the present invention.

A preferred embodiment provides that the coupling element comprises an at least partially carbon containing material, especially graphite, or hexagonal boron nitride.

In an embodiment, the coupling element is embodied in the form of a layer, a coating, or a film, especially a thin film. Especially, the coupling element is an essentially 2-dimensional element, especially one applied on a contour of a wall of the pipe or tube. The coupling element can, in such case, have, for example, a triangular, quadrilateral, round or even elliptical area.

In an embodiment, the apparatus further comprises a measuring tube, which is integrateable into an existing pipeline, wherein at least the heating element, the first temperature sensor and the coupling element are arranged on or in a wall of the measuring tube. Alternatively, an option is that the apparatus is embodied to be attachable externally onto a pipe or tube. In such case, the apparatus is a clamp-on measuring device.

Independently of whether the apparatus comprises a measuring tube or is embodied as a clamp-on measuring device, the apparatus advantageously includes a securement unit, especially for releasable securement of at least one component of the apparatus onto the pipe or the measuring tube.

A preferred embodiment of the apparatus provides that the coupling element is arranged at least partially between the heating element and the first temperature sensor, especially in the media far region of the first temperature sensor. The temperature sensor is, in this case, placed on or introduced into the pipe or measuring tube. Located on the pipe or measuring tube far side of the temperature sensor, in turn, is the coupling element, followed by the heating element.

An alternative preferred embodiment provides that the heating element and the first temperature sensor are arranged next to one another essentially in a plane, wherein the coupling element is arranged between the medium and the first temperature sensor and the heating element. In such case, the coupling element is correspondingly placed on or introduced into the pipe or measuring tube. Located adjoining on the pipe or measuring tube far side of the coupling element, in turn, are the heating element and the first temperature sensor.

Advantageously, the coupling element is arranged in such a manner on the pipe or on/in the measuring tube that an imaginary connecting line between the first temperature sensor and the heating element has a predeterminable angle to a longitudinal axis through the pipe or tube and/or wherein a width and/or a thickness of the coupling element along a length of the coupling element are/is at least sectionally variable and/or wherein the coupling element is produced, at least in a first portion, of a first material and, at least in a second portion different from the first portion, of a second material. This and like measures mean that the thermal coupling of the coupling element can be adapted to the particular conditions of an application. The coupling element is correspondingly adapted for the particular application as regards shape, orientation relative to the flow direction and to the pipe or tube and utilized materials of the coupling element, in order to be able to assure an as high as possible thermal coupling. Thus, different materials and wall thicknesses of various tubes or pipes, various physical and chemical properties of various media as well as different ranges for the expected flow velocities, or flow profiles, within the pipe or tube can be considered.

In a preferred embodiment, the coupling element is at least partially embodied and/or arranged in such a manner that, when the heating element is supplied with the heating signal, the coupling element transports a first predeterminable amount of heat from the heating element to the first temperature sensor and a second predeterminable amount of heat from the heating element to the medium. Dimensioning and embodiment of the coupling element depend, thus, also on the utilized heating signal, and the heating signal can be adapted corresponding to the embodiment of the coupling element. In given cases, the pipe or tube lies between the coupling element and the medium. In such case, heat transport from the heating element to the medium occurs via the coupling element and at least one portion of the pipe or tube.

A first part of the heating power provided by means of the heating element flows from the heating element via the coupling element to the first temperature sensor and a second part of the heating power provided by means of the heating element flows from the heating element via the coupling element through the pipe or measuring tube to the medium. In the case of a changing flow velocity, the first and second predeterminable amounts of heat change. When the heating element is heated with a constant heating power, then the temperature ascertained by means of the first temperature sensor changes. The temperature change is then a measure for the flow. In the case that the apparatus is heated with a variable heating power, the heating power required for maintaining a predeterminable temperature of the first temperature sensor changes.

Another preferred embodiment provides that the apparatus comprises at least the first and a second temperature sensor. The second temperature sensor can serve for increasing the accuracy of measurement or even for providing redundancy, for example, in the case of a defect in one of the two temperature sensors. As in the case of the first temperature sensor and the heating element, also the second temperature sensor is arranged outside of an internal volume of the pipe or tube flowed through by the medium and, thus, also the second temperature sensor does not contact the process.

In this regard, the coupling element is advantageously at least partially embodied and/or arranged in such a manner that, when the heating element is supplied with the heating signal, the coupling element transports a third predeterminable amount of heat from the heating element to the second temperature sensor. This embodiment occurs analogously to the case, in which only a single temperature sensor is present.

Likewise advantageously, at least a first portion of the coupling element or a first coupling element is arranged between the heating element and the first temperature sensor, especially in the media far region of the first temperature sensor, and wherein at least the second temperature sensor is arranged next to the first temperature sensor and the heating element, wherein at least a second portion of the coupling element or a second coupling element is arranged between the medium and the second temperature sensor and is in thermal contact with the first temperature sensor and the heating element.

Alternatively, however, also the heating element and the two temperature sensors can be arranged next to one another along a shared connecting line, or the heating element and the first temperature sensor can be arranged on a first connecting line and the second temperature sensor and the heating element can be arranged on a second connecting line, wherein the first and the second connecting line have a predeterminable angle between one another. The coupling element can, in this case, be embodied, for example, rectangularly, U-shaped, L-shaped, or T-shaped, wherein the heating element and the two temperature sensors are arranged at different positions along a surface of the coupling element.

It is, finally, likewise advantageous that the apparatus has at least first and second coupling elements, wherein the first coupling element is at least partially embodied and/or arranged in such a manner that, when the heating element is supplied with the heating signal, the first coupling element transports a first predeterminable amount of heat from the heating element to the first temperature sensor, and wherein the second coupling element is at least partially embodied and/or arranged in such a manner that, when the heating element is supplied with the heating signal, the second coupling element transports a third predeterminable amount of heat from the heating element to the second temperature sensor. The two coupling elements are, in such case, likewise thermally coupled with one another, especially in the region of the heating element.

The object of the invention is likewise achieved by a method for operating an apparatus of the invention for determining and/or monitoring a volume flow, a mass flow and/or a flow velocity of a flowable medium through a pipe or tube. In the case of the method, a heating element is heated at least at times by means of a heating signal, and a first temperature sensor is operated at least at times by means of a first temperature signal. Moreover, information concerning volume flow, mass flow and/or flow velocity and/or temperature of the medium is ascertained.

The first temperature sensor can, on the one hand, be applied for determining and/or monitoring the flow. Likewise, however, supplementally or alternatively, a determining of the temperature of the medium is provided. Both process variables can be ascertained, depending on application, for example, simultaneously, periodically alternately, or at essentially predeterminable points in time. For example, the flow can be determined essentially continuously, while the temperature of the medium is determined at predeterminable points in time. Advantageously, at a point in time, when the temperature of the medium is determined, the heating element is not supplied with a heating signal, in order to prevent a corruption of the ascertained temperature of the medium by a supplementally introduced heating power.

For determining the particular process variable, flow or temperature, it is furthermore an option that changes of the particular process variables are tracked, or that measured values are compared with characteristic curves or lines stored in the apparatus.

It is noted, furthermore, that the heating signal can be either a pulsed signal or a continuous signal, and the temperature signal can be either a pulsed signal or a continuous signal.

A preferred embodiment of the method provides that at least a second temperature sensor is operated at least at times by means of a second temperature signal. For example, information concerning volume flow, mass flow and/or flow velocity and/or temperature of the medium is gained based on a first temperature determined by means of the first temperature sensor and/or based on a second temperature determined by means of the second temperature sensor.

The use of at least two temperature sensors enables various embodiments. For example, the first temperature sensor can provide information concerning flow and the second temperature sensor information concerning temperature. Also, the two temperature sensors can be applied for flow determination and/or—monitoring. In such case, the values of the temperatures ascertained by means of the two temperature sensors can be compared with one another. For example, a difference between the measured values ascertained by means of the two temperature sensors can be formed and evaluated.

It is to be noted here that the embodiments explained in connection with the apparatus can be used mutatis mutandis also for the method and vice versa.

BRIEF DESCRIPTION OF THE DRAWINGS

The invention will now be explained in greater detail based on the appended drawing, the figures of which show as follows.

In the figures, equal features are provided with equal reference characters.

DETAILED DESCRIPTION

Figure 1:
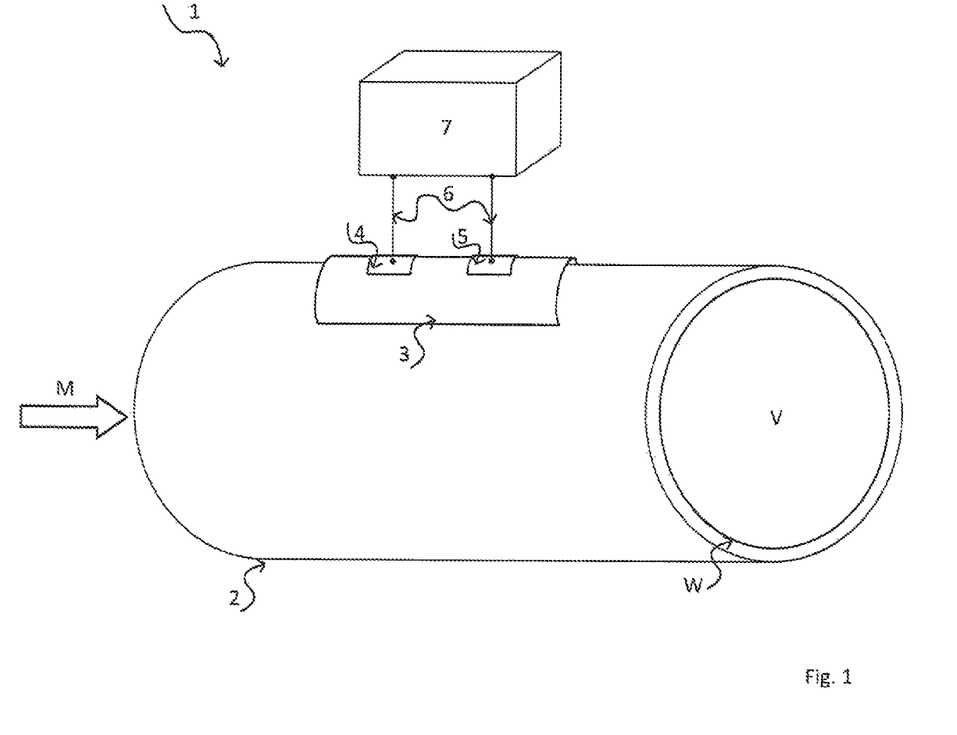
FIG. 1 shows a schematic view of a clamp-on flowmeter of the present disclosure having a heating element and a single temperature sensor arranged next to the heating element.

FIG. 1 shows a thermal flowmeter 1 having a coupling element 3, a heating element 4 and a first temperature sensor 5, which measuring device 1 is mounted on a wall W of a pipe 2, through which medium M flows in the direction indicated by the arrow. For mounting the apparatus 1 on the pipe, different variants are possible. In the embodiment shown in FIG. 1, the measuring device 1 is embodied as a clamp-on measuring device, which can be mounted externally on the tube 2. For this, all securement options well known to those skilled in the art can be used and fall within the scope of the present invention. In another embodiment (not shown), the heating element 4, the first temperature sensor 5 and the coupling element 3 are integrated into a measuring tube, which, in turn, can be connected into an existing pipeline. In such case, the coupling element 3, the heating element 4 and the first temperature sensor 5 can also be integrated into the wall of the measuring tube. In each case, the apparatus 1 is designed in such a manner that the sensor unit, thus, at least the heating element 3 and the first temperature sensor 4, do not contact the process. This means that the heating element and the first temperature sensor (as well as, in given cases present, other temperature sensors 8) are arranged outside of the internal volume V of the tube 2 flowed through by the medium M. They terminate thus, at least essentially, flushly with an inner wall of the tube 2, or are in the wall W or placed on the outer wall of the tube 2.

The heating element 4 is arranged next to the first temperature sensor 5. Both the heating element 4 as well as also the first temperature sensor 5 are, furthermore, arranged on the coupling element 3 and are by means of the coupling element 3 in thermal contact with one another and with the medium M.

In other embodiments of the present invention, the device can also have a plurality of heating elements 4, a plurality of temperature sensors 5,8 and/or a plurality of coupling elements 3.

Connection wires 6 connect the heating element 4 and the first temperature sensor 5 with an electronics unit 7, which serves for signal registration, —evaluation and—feeding. It is to be noted here that the number of connection wires 6 can vary from embodiment to embodiment. Also, the electronics unit 7 is, in each case, adapted to the embodiment of the measuring device 1.

The coupling element 3 places the heating element 4 at least partially and/or at times in thermal contact with the medium M. In ongoing operation for determining flow or flow velocity, the heating element 4 can, for example, be heated with a variable heating power P to a predeterminable temperature T or with a constant heating power P to have a variable temperature T. Fundamentally, there occurs, thus, a heat exchange between the measuring device 1 and the medium M, or a heat movement, or a heat flux, from the heating element 4 to the medium M. In such case, the thermal contact resistance between the heating element 4 and the flowing medium M changes as a function of the flow velocity v.

The coupling element 3 effects both a thermal coupling of the heating element 4 and the first temperature sensor 5 as well as also a thermal coupling to the medium M. Especially, the coupling element 3 assures that a first predeterminable amount of heat flows from the heating element 4 to the first temperature sensor 5 and a second predeterminable amount of heat from the heating element 4 to the medium M. A heat flow out-going from the heating element 4 can be influenced by means of the coupling element 3, with targeting, especially relative to the propagation directions of amounts of heat and to the dividing of an amount of heat into different directions. The coupling element can be suitably embodied and arranged for determining the amounts of heat, which flow from the heating element 4 to the first temperature sensor 5 and to the medium, respectively. Examples of possible embodiments are shown in the following figures.

Preferably, the coupling element 3 is composed of a material having a high thermal conductivity, for example, a metal. However, also graphite or other materials can be used.

The first temperature sensor 5 can, on the one hand, be used for determining and/or monitoring flow and/or flow velocity. Additionally or alternatively, the temperature T of the medium M can be ascertained with the first temperature sensor.

Figure 2:
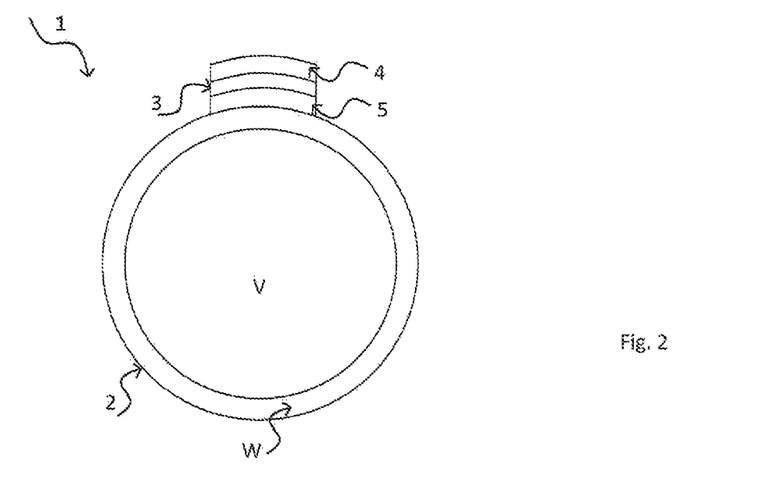
FIG. 2 shows a schematic view of a clamp-on flowmeter of the present disclosure having a heating element and a single temperature sensor arranged between the heating element and pipe.

A second possible embodiment of a measuring device 1 of the invention is shown in FIG. 2. As in FIG. 1, this is, by way of example, a clamp-on measuring device. Also in this case, the apparatus 1 is securable to the pipe 2 with all securing means known to those skilled in the art. Also, a corresponding embodiment using a separate measuring tube (not shown) can be implemented.

In contrast with FIG. 1, the first temperature sensor 5 and the heating element 4 are arranged on top of one another in FIG. 2. The temperature sensor 5 is placed against a wall W of the pipe 2.

Located on the pipe 2 far side of the first temperature sensor 5 is the coupling element 3, followed by the heating element 4. In another embodiment (not shown), furthermore, a second coupling element can be arranged between the first temperature sensor 5 and the wall W of the pipe 2. In the shown embodiment, the cross sectional area of the heating element 4 and the coupling element 5 are essentially equally large. However in other embodiments, the heating element 4 and the coupling element 3 can also be dimensioned differently.

Connection wires 6 and electronics unit 7 are not shown in FIG. 2. Operation of the heating element 4 and first temperature sensor 5, e.g. their feeding with suitable heating signal and temperature signal, respectively, occurs analogously to FIG. 1.

For the embodiment of the coupling element 3 and for the arrangement of the heating element 4 and the first temperature sensor 5 relative to the coupling element 3 and to the pipe or tube 2, numerous variants are possible and fall within the scope of the present invention. Without intending to limit the scope of the invention, different possible variants for an apparatus of the invention are shown by way of example in the following.

FIG. 3 shows various embodiments for an apparatus having a heating element 4 and a first temperature sensor 5. Shown in FIG. 3a are the heating element 4 and the adjoining first temperature sensor 5 both positioned on the coupling element 3, which, in turn, is mounted on the wall W of the pipe or tube 2. The imaginary connecting line a extending between the heating element 4 and the first temperature sensor 5, for example, a connecting line a extending through the center points or borders of the heating element 4 and the first temperature sensor 5, extends in parallel with the longitudinal axis through the pipe or tube 2 and in parallel with the flow direction of the medium M. Of course, the sequence of the heating element 4 and the first temperature sensor 5 in parallel with the flow direction can be different in different embodiments. It is, thus, possible to arrange the first temperature sensor 5 in the flow direction either before or after the heating element 4. Furthermore, other geometric forms are possible for coupling element 3 and likewise fall within the scope of the present invention. For example, the coupling element 3 can also be embodied to be oval, circular, or even triangular.

Figure 3A:
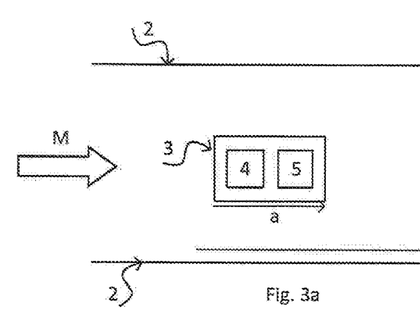
FIG. 3 shows various embodiments of a flowmeter of the present disclosure having a heating element and a first temperature sensor arranged next to the heating element.
Figure 3B:
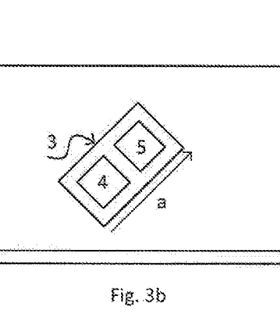
Figure 3C:
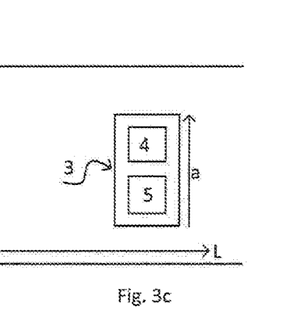

The embodiment of FIG. 3b differs from that of FIG. 3a in that the connecting line a has an angle of, for instance, 45° from the longitudinal axis through the tube 2. In the case of the variant of FIG. 3c, the angle between the connecting line and the longitudinal axis L amounts to 90°. It is to be noted here that, in the context of the present invention, also other values are possible for the angle between the connecting line a and the longitudinal axis L. The thermal coupling between the coupling element 3 and the medium 2 as well as between the heating element 4 and the first temperature sensor 5 can, with targeting, be set and adapted by choice of the angle between the connecting line and the longitudinal axis L.

Figure 3D:
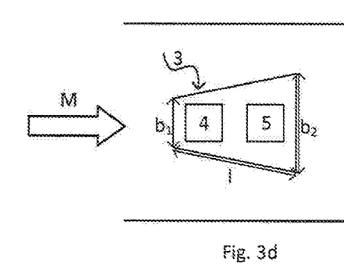

However, also other are measures possible for adapting the thermal coupling. For example, the coupling element 3 can be embodied in such a manner that its width b is variable along the length l of the coupling element. For this, a continuous variation of the width b provides an option, such as shown in FIG. 3d, or even a stepped variation of the width b (not shown).

Figure 3E:
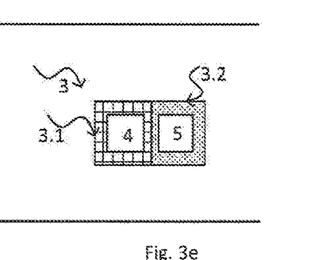

Another possible measure for selecting and/or setting the thermal coupling is to manufacture the coupling element 3 at least in a first portion 3.1 from a first material and at least in a second portion 3.2 different from the first portion 3.1 from a second material, such as shown by way of example in FIG. 3e.

Figure 3F:
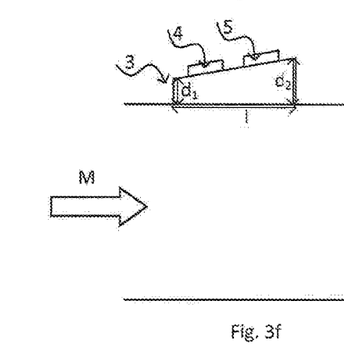
Figure 3G:
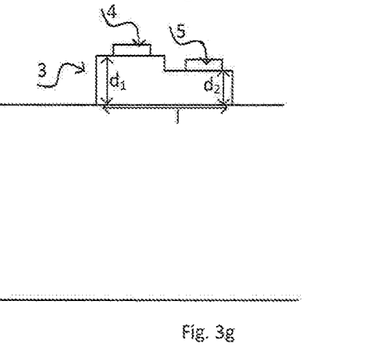

Yet another possible measure by way of example is to vary the thickness d of the coupling element along the longitudinal axis L, such as illustrated in FIGS. 3f and 3g. In FIG. 3f, the thickness d increases from a value $d_1$ continuously to a value $d_2$, while in FIG. 3g the thickness varies stepwise and the coupling element 3 has a thickness $d_1$ in a first portion and a thickness $d_2$ in a second portion.

Besides the described measures, numerous other options are possible for selecting and/or setting the thermal coupling provided by coupling element 3 and fall likewise within the scope of the present invention. Also, various measures are combinable with one another to the extent desired. Also, corresponding measures for an embodiment of the apparatus 1 are possible, such as it is shown in FIG. 2.

Another preferred embodiment for a flowmeter 1 of the invention is shown in FIG. 4. Here the apparatus 1 includes, besides the coupling element 3, the heating element 4 and the first temperature sensor 5, an additional temperature sensor 8. A first predeterminable amount of heat is transported from the heating element 4 to the first temperature sensor 5, while a second predeterminable amount of heat flows from the heating element 4 to the medium M and a third predeterminable amount of heat from the heating element 4 to the second temperature sensor 8. Likewise such as in the case of the preceding figures, a corresponding apparatus 1 can be embodied both as a clamp-on measuring device 1 or as one having a separate measuring tube. The possibilities are likewise many, such as in the case of FIGS. 1 and 2. Solely the second temperature sensor 8 needs to be supplemented, wherein also for this again numerous options are available.

The variants shown in FIG. 4 in this regard are correspondingly to be viewed by way of example, as in the case of FIG. 3. The present invention is not limited to the illustrated variants. Shown in FIG. 4a are the heating element 4 and the first 5 and second 8 temperature sensors mounted next to one another on the coupling element 3 along a shared imaginary connecting line a. The coupling element 3 is, in turn, mounted on the wall W of the pipe or tube 2. In contrast with FIG. 4a, in FIG. 4b, the heating element 4 is arranged between the two temperature sensors 5 and 8.

Figure 4A:
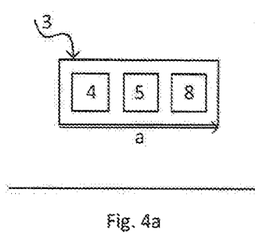
FIG. 4 shows various embodiments of a flowmeter of the present disclosure having a heating element and two temperature sensors.
Figures 4B, 4C:
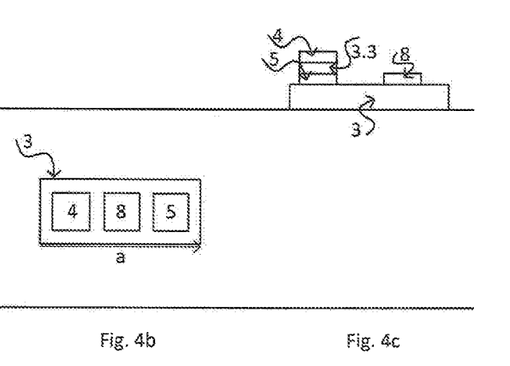

Shown in FIG. 4c are the first temperature sensor 5, the coupling element 3.3 and the heating element 4 embodied analogously to the variant of FIG. 2. In contrast with FIG. 2, the heating element 4, the coupling element 3.3 and the first temperature sensor 5 are, however, not directly mounted on the wall W of the pipe or tube 2, but, instead, with interpositioning of the additional coupling element 3. The coupling elements 3 and 3.3 can be of the same material, or of different materials. In addition to the heating element 4, coupling element 3.3 and first temperature sensor 5, a second temperature sensor 8 is provided, which is likewise located on the coupling element 3. In another embodiment (not shown), the two temperature sensors 5,8 and the heating element 4 can all be arranged on one another, especially on top of one another. The coupling element 3 is then placed between at least two of the components. However, also a plurality of coupling elements 3 can be used, which can, for example, be placed between, in each case, two components.

Figure 4D:
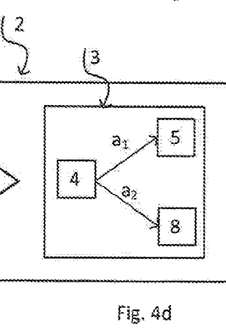
Figure 4E:
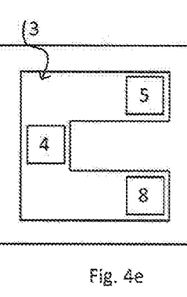
Figure 4F:
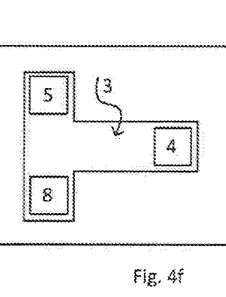
Figure 4G:
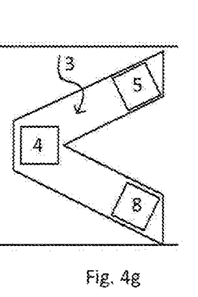

For selecting and setting the thermal coupling provided by means of the coupling element 3 in the case of the two temperature sensors 5,8, also numerous other measures are possible. For example, the shape and/or dimensioning of the coupling element 3, or the relative arrangement of the heating element 4 and the two temperature sensors 5,8 can be suitably selected. Thus, the coupling element 3 of FIG. 4d is rectangularly embodied here in the form of a square, while in FIG. 4e it is U-shaped, in FIG. 4f T-shaped, and in FIG. 4g V-shaped. In the case of all these embodiments of the shape of the coupling element, the heating element 4 and the first temperature sensor 5 are positioned along a first imaginary connecting line $a_1$ and the second temperature sensor 8 and the heating element 4 along a second imaginary connecting line ($a_2$), wherein a suitable angle can be set between the two connection lines a1 and a2. This arrangement is similar to the arrangements shown in FIGS. 3b and 3c for the case of a single, first temperature sensor 5.

Figure 4H:
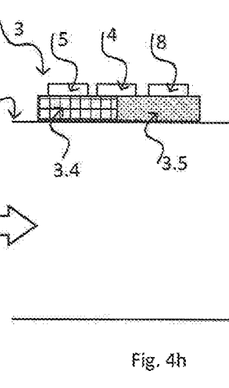

As shown in FIG. 4h, in contrast, the apparatus 1 includes a first coupling element 3.4 and a second coupling element 3.5. Coupling elements 3.4 and 3.5 adjoin one another and the heating element 4 is positioned at an interface between the two coupling elements 3.4 and 3.5 in such a manner that it is in thermal contact both with the first 3.4 as well as also with the second coupling element 3.5. By supplying the heating element 4 with the heating signal, a first predeterminable amount of heat is transported by means of the first coupling element 3.4 from the heating element 4 to the first temperature sensor 5 and a third predeterminable amount of heat is transported from the heating element 4 to the second temperature sensor 8. A transport of heat from the heating element 4 to the medium M takes place by means of the two coupling elements 3.4 and 3.5.

Figure 4I:
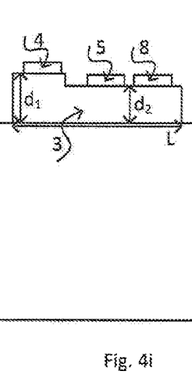
Figure 4K:
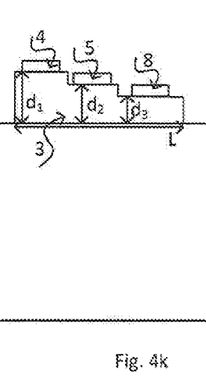
Figure 4L:
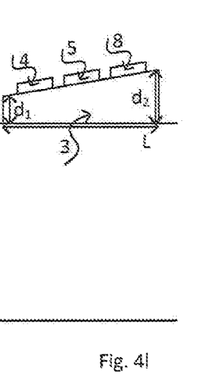

Further examples of possible measures similar to the cases of FIGS. 3f and 3g vary the thickness d of the coupling element 3 along the longitudinal axis L, such as shown by FIGS. 4i, 4k and 4l. Same as shown in FIG. 3, the thickness d can be varied continuously or stepwise.

As also in the case of an embodiment having a single, first temperature sensor 5, the different variants shown in FIG. 4 can be combined with one another to the extent desired. Also, variants shown in FIG. 3 can be applied analogously to the case of an apparatus 1 with two temperature sensors 5,8, such as shown in FIG. 4, and vice versa. It is noted, furthermore, that the options shown in FIG. 4 are not exclusive. Rather, numerous other examples can be considered, which likewise fall within the scope of the present invention.

Figure 5A:
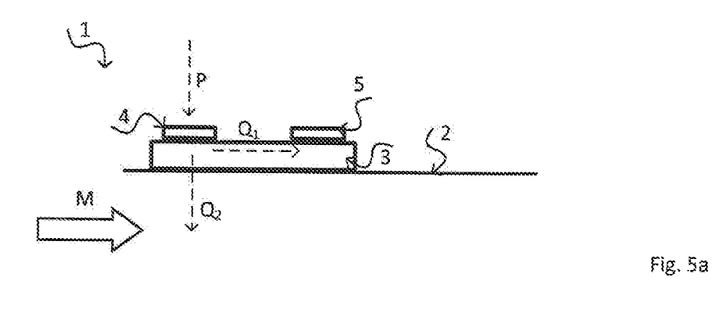
FIG. 5 shows a schematic view of heating power and flowing amounts of heat for illustrating the measuring principle underlying the present disclosure.

Finally a schematic view of the measuring principle underlying the present invention is shown in FIG. 5. FIG. 5a shows an apparatus of the invention such as shown in FIG. 2a, together with the amounts of heat $Q_1$ and $Q_2$. By supplying the first temperature sensor 5 with a heating signal P, the second predeterminable amount of heat $Q_2$ flows from the heating element 4 to the medium M, and the first predeterminable amount of heat $Q_1$ from the heating element 4 to the first temperature sensor 5. The sizes of the predeterminable amounts of heat $Q_1$ and $Q_2$ depend, in such case, on the geometric embodiments of the apparatus 1, the utilized materials, on the pipe or tube 2 and also on the medium M and its flow velocity v.

Figure 5B:
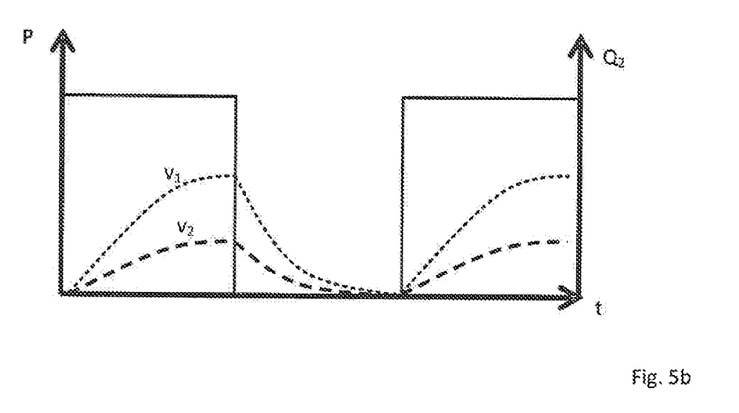

FIG. 5b shows a schematic view of a heating signal P in the form of rectangular pulses (solid line), as well as the second predeterminable amount of heat $Q_2$ for two different flow velocities $v_1$ (dotted line) and $v_2$ (dashed line) of the medium M, in each case, as a function of time t. The heating signal P is always constant for the duration of the pulses. It is to be noted that the heating signal P shown here is by way of example. In other embodiments, the heating signal P can, for example, be sinusoidal, trapezoidally shaped or even sawtooth shaped. The temperature T of the medium is the same for the two flow velocities $v_1$ and $v_2$ and is constant with time. $v_1$ is greater than $v_2$. The predeterminable amounts of heat $Q_1$ and $Q_2$, or their fractions of the total amount of heat $Q_{tot}=Q_1+Q_2$, depend on the flow velocity v of the medium M. If, for example, the flow velocity v increases from the lower value $v_2$ to the greater value $v_t$, then $Q_2$ increases, since more heat is transported from the heating element 4 to the medium M. Correspondingly, the second predeterminable amount of heat $Q_1$ lessens. As a consequence, a lower temperature T is measured by means of the first temperature sensor 5, wherein the temperature change $\Delta T$ of the temperature measured by means of the first temperature sensor 5 is proportional to the change of flow velocity v of the medium M.

Figure 5C:
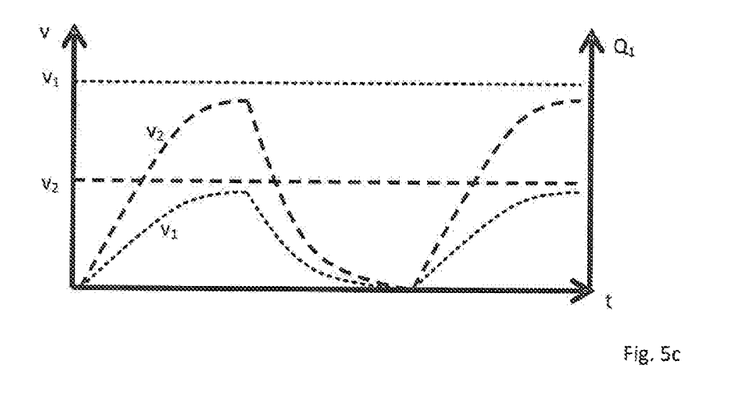

This relationship is shown yet again in FIG. 5c based on a schematic view of the first predeterminable amount of heat $Q_1$ and the first flow velocity $v_1$ (dotted line) and the second flow velocity $v_2$ (dashed line), each as a function of time t. If, for example, the flow velocity v increases from the lower value $v_2$ to the greater value $v_1$, then $Q_1$ lessens, since more heat is transported from the heating element 4 to the medium M. As a consequence, a lower temperature T is measured by means of the first temperature sensor 5, such as already described in connection with FIG. 5b.

The temperature T measured by means of the first temperature sensor 5 is, in principle, a measure for the first predeterminable amount of heat $Q_1$. Again, the temperature T of the medium M is constant, so that an influence of a variable temperature of the medium T on the variables measured by means of the apparatus 1 can be excluded. Of course, the described relationships of the principle hold also for the case of a variable temperature of the medium T. Likewise, analogous considerations hold for the case, in which at least a second temperature sensor 8 is provided.

The invention claimed is:

1. An apparatus for determining and/or monitoring a volume flow, a mass flow, and/or a flow velocity of a flowable medium through a pipe or a tube, the apparatus comprising:
    a heating element, which is at least partially and/or at times in thermal contact with the medium and which is heatable in response to a heating signal;
    a first temperature sensor configured to register a temperature of at least one component of the apparatus or a temperature of the medium and which is operable at least at times via a first temperature signal, wherein the heating element and the first temperature sensor are arranged outside of an internal volume of the pipe or the tube flowed through by the medium;
    a first coupling element at least partially in thermal contact with the heating element, the first temperature sensor and a wall of the pipe or the tube, wherein the first coupling element is configured to enable a thermal coupling between the heating element and the medium via the wall of the pipe or tube through which the medium flows,
    wherein the first coupling element is composed at least partially of a first material having an anisotropic thermal conductivity, which first material is a carbon-containing material or hexagonal boron nitride, and wherein the first coupling element is configured as a layer, coating or film in the form of a two-dimensional element and is affixed to the wall of the pipe or tube; and
    a second temperature sensor arranged next to the first temperature sensor and the heating element,
    wherein a second coupling element is arranged between the heating element and the first temperature sensor in a region of the first temperature sensor facing away from the medium, and wherein at least a portion of the first coupling element is arranged between the medium and the second temperature sensor and is in thermal contact with the first temperature sensor and the heating element.

2. The apparatus as claimed in claim 1, further comprising:
    a measuring tube which is integratable into an existing pipeline, wherein at least the heating element, the first temperature sensor, the second temperature sensor, and the first coupling element are arranged on a wall of the measuring tube.

3. The apparatus as claimed in claim 1, wherein the apparatus is embodied to be attachable externally onto the pipe or the tube.

4. The apparatus as claimed in claim 1,
    wherein a further portion of the first coupling element is arranged between the medium and the first temperature sensor.

5. The apparatus as claimed in claim 1,
    wherein the first coupling element is arranged such that an imaginary connecting line between the first temperature sensor and the heating element has a predeterminable angle to a longitudinal axis through the pipe or the tube.

6. The apparatus as claims in claim 1, wherein a width and/or a thickness of the first coupling element along a length of the first coupling element are/is at least sectionally variable.

7. The apparatus as claimed in claim 1, wherein the first coupling element comprises the first material at least in the portion and, at least in a further portion of the first coupling element, a second material different from the first material.

8. The apparatus as claimed in claim 1,
    wherein the first coupling element is at least partially embodied and/or arranged in such a manner that, when the heating element is supplied with the heating signal, the first coupling element transports a first predeterminable amount of heat from the heating element to the first temperature sensor and a second predeterminable amount of heat from the heating element to the medium.

9. The apparatus as claimed in claim 1,
    wherein the first coupling element is at least partially embodied and/or arranged such that when the heating element is supplied with the heating signal, the first coupling element transports a third predeterminable amount of heat from the heating element to the second temperature sensor.

10. The apparatus as claimed in claim 1, further comprising:
the second coupling element, wherein the first coupling element is at least partially embodied and arranged such that, when the heating element supplied with the heating signal, the first coupling element transports a first predeterminable amount of heat from the heating element to the first temperature sensor, and
wherein the second coupling element is at least partially embodied and is arranged such that, when the heating element is supplied with the heating signal, the second coupling element transports a third predeterminable amount of heat from the heating element to the second temperature sensor.

11. The apparatus as claimed in claim 1, wherein the first coupling element comprises the first material, and the second coupling element comprises a second material different than the first material.

12. A method for operating an apparatus for determining and/or monitoring a volume flow, a mass flow, and/or a flow velocity of a flowable medium through a pipe or tube, comprising:
providing the apparatus, the apparatus including:
a heating element which is at least partially and/or at times in thermal contact with the medium and which is heatable via a heating signal; and
a first temperature sensor configured to register a temperature of at least one component of the apparatus or a temperature of the medium, and which is operable at least at times via a first temperature signal, wherein the heating element and the first temperature sensor are arranged outside of an internal volume of the pipe or the tube flowed through by the medium;
a first coupling element at least partially in thermal contact with the heating element, the first temperature sensor, and/or a portion of the pipe or the tube, wherein the first coupling element is configured to enable a thermal coupling between the heating element and the first temperature sensor and between the heating element and a wall of the pipe or tube through which the medium flows,
wherein the first coupling element is composed at least partially of a material having an anisotropic thermal conductivity, which material is a carbon-containing material or hexagonal boron nitride, and wherein the first coupling element is configured as a layer, coating or film in the form of a two-dimensional element and is affixed to the wall of the pipe or tube; and
a second temperature sensor,
wherein a second coupling element is arranged between the heating element and the first temperature sensor in a portion of the first temperature sensor facing away from the medium, wherein at least the second temperature sensor is arranged next to the first temperature sensor and the heating element, and wherein at least a second portion of the first coupling element is arranged between the medium and at least the second temperature sensor and is in thermal contact with the first temperature sensor and the heating element;
heating the heating element in response to a heating signal;
operating the first temperature sensor via a first temperature signal; and
ascertaining information concerning the volume flow, the mass flow, the flow velocity, and/or a temperature of the medium.

13. The method as claimed in claim 12, further comprising operating the second temperature sensor via a second temperature signal.

* * * * *